(12) United States Patent
Ayzenfeld et al.

(10) Patent No.: US 8,918,568 B2
(45) Date of Patent: Dec. 23, 2014

(54) PCI EXPRESS SR-IOV/MR-IOV VIRTUAL FUNCTION CLUSTERS

(75) Inventors: Avraham Ayzenfeld, Tel Aviv (IL); Emmanuel Elder, Haifa (IL); Ilya Granovsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/102,120

(22) Filed: May 6, 2011

(65) Prior Publication Data

US 2012/0284437 A1  Nov. 8, 2012

(51) Int. Cl.
G06F 13/00 (2006.01)
G06F 13/14 (2006.01)

(52) U.S. Cl.
CPC .................................. *G06F 13/14* (2013.01)
USPC ....................................................... 710/104

(58) Field of Classification Search
USPC ................................. 710/104, 313
See application file for complete search history.

(56) References Cited

U.S. PATENT DOCUMENTS

| | | | |
|---|---|---|---|
| 7,529,860 B2 | 5/2009 | Freimuth et al. | |
| 2008/0147898 A1* | 6/2008 | Freimuth et al. | 710/8 |
| 2009/0248947 A1* | 10/2009 | Malwankar et al. | 710/316 |
| 2011/0016235 A1* | 1/2011 | Brinkmann et al. | 710/8 |
| 2012/0167085 A1* | 6/2012 | Subramaniyan et al. | 718/1 |
| 2012/0215941 A1* | 8/2012 | Brownlow et al. | 710/3 |

* cited by examiner

*Primary Examiner* — Nimesh G Patel
(74) *Attorney, Agent, or Firm* — International IP Law Group, PLLC

(57) ABSTRACT

An apparatus, including a first multiple of virtual function clusters positioned on a Peripheral Component Interconnect Express (PCIe) configuration space, each of the clusters comprising at least one virtual function, and a second multiple of physical functions positioned on the PCIe configuration space. The apparatus also includes an extended virtual function shell positioned on the PCIe configuration space and configured to select one of the physical functions, to select one of the available virtual function clusters and to associate the selected virtual function cluster with the selected the physical function.

24 Claims, 3 Drawing Sheets

PCI EXPRESS SR-IOV/MR-IOV VIRTUAL FUNCTION CLUSTERS

FIELD OF THE INVENTION

The present invention relates generally to input/output (I/O) devices, and specifically to a hardware framework for executing virtual functions on a Peripheral Component Interconnect Express device operating in single root or multiple root I/O virtualization environment.

BACKGROUND OF THE INVENTION

Peripheral Component Interconnect (PCI) Express is a standard for coupling motherboard-mounted peripherals, and as an expansion card interface for add-in boards. Typically, PCI Express (PCIe) peripherals are auto configured via a PCI configuration space. In addition to memory-mapped and I/O port spaces, each device on the PCIe bus has a configuration space.

In a PCI Express system, a root complex device typically couples a processor and memory subsystem to a PCI Express switch fabric comprising one or more switch devices. The PCI Express system may also include endpoints configured to perform and/or request PCI Express transactions. Each endpoint typically comprises one or more functions, and is mapped into the configuration space as a single function in a device that may include either the single function or multiple functions.

PCI Express endpoints and legacy (i.e., PCI) endpoints typically appear within a hierarchical domain originated by the root complex. In other words, the endpoints appear in the configuration space as a tree, with a root port as its head. Additionally, root complex integrated endpoints and root complex event collectors typically do not appear within one of the hierarchical domains originated by the root complex. Instead, the root complex integrated endpoints and root complex event collectors generally appear in the configuration space as peers of the root ports.

Implementing virtualization can increase the effective hardware resource utilization of a PCI-Express device (i.e., the number of applications executing on the device). This approach has been addressed in the Single Root I/O Virtualization (SR-MY) and Sharing Specification, Revision 1.0, Sep. 11, 2007, as well as in the Multiple Root I/O Virtualization (MR-IOV) and Sharing Specification, revision 1.0, May 12, 2008, from the PCI Special Interest Group (SIG), whose disclosures are incorporated herein by reference. Both the SR-IOV and MR-IOV specifications define extensions to the PCIe specification, and enable multiple system images to share PCIe hardware resources. A system image comprises computer software such as operating systems, used to execute applications or trusted services, e.g., a shared or non-shared I/O device driver.

SR-IOV and MR-IOV enable a PCIe device to appear to be multiple separate physical PCIe devices. In addition to functions, which comprise PCIe device configurations, SR-IOV and MR-IOV introduce the idea of physical functions and virtual functions, which can be used to enhance performance of the PCIe device.

Physical functions are full-featured PCIe functions (per the PCI Express® Base Specification, Revision 3.0, Oct. 24, 2010, from PCI-SIG, whose disclosure is incorporated herein by reference) that support the SR-IOV capability and are accessible to a single root PCI Manager (which can be part of a multiple root system), a virtual image, or a system image. In addition to having the capability to convey data "in and out" of a PCIe device, physical functions typically have full configuration resources, thereby enabling them to configure or control the PCIe device via the physical functions.

Virtual functions are "lightweight" PCIe function that execute on a SR-IOV/MR-IOV endpoint, and are directly accessible by a system image. Each instance of a virtual function can link to an underlying physical function, and typically only has the ability to convey data in and out of the PCIe device.

The SR-IOV/MR-IOV capability typically reserves 16 bits for the number of virtual functions (i.e., NumVFs located at address 0×10 in the SR-IOV Capability), meaning that the total number of virtual functions can theoretically reach 65,536 (i.e., 64K)

SUMMARY OF THE INVENTION

There is provided, in accordance with an embodiment of the present invention an apparatus, including a first multiple of virtual function clusters positioned on a Peripheral Component Interconnect Express (PCIe) configuration space, each of the clusters comprising at least one virtual function, a second multiple of physical functions positioned on the PCIe configuration space, and an extended virtual function shell positioned on the PCIe configuration space and configured to select one of the physical functions, to select one of the available virtual function clusters and to associate the selected virtual function cluster with the selected the physical function.

There is also provided, in accordance with an embodiment of the present invention a method, including selecting a virtual function cluster comprising at least one virtual function, the cluster one of a first multiple of clusters positioned on a Peripheral Component Interconnect Express (PCIe) configuration space, and associating the selected cluster to a physical function, the physical function one of a second multiple of physical functions positioned on the PCIe configuration space.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
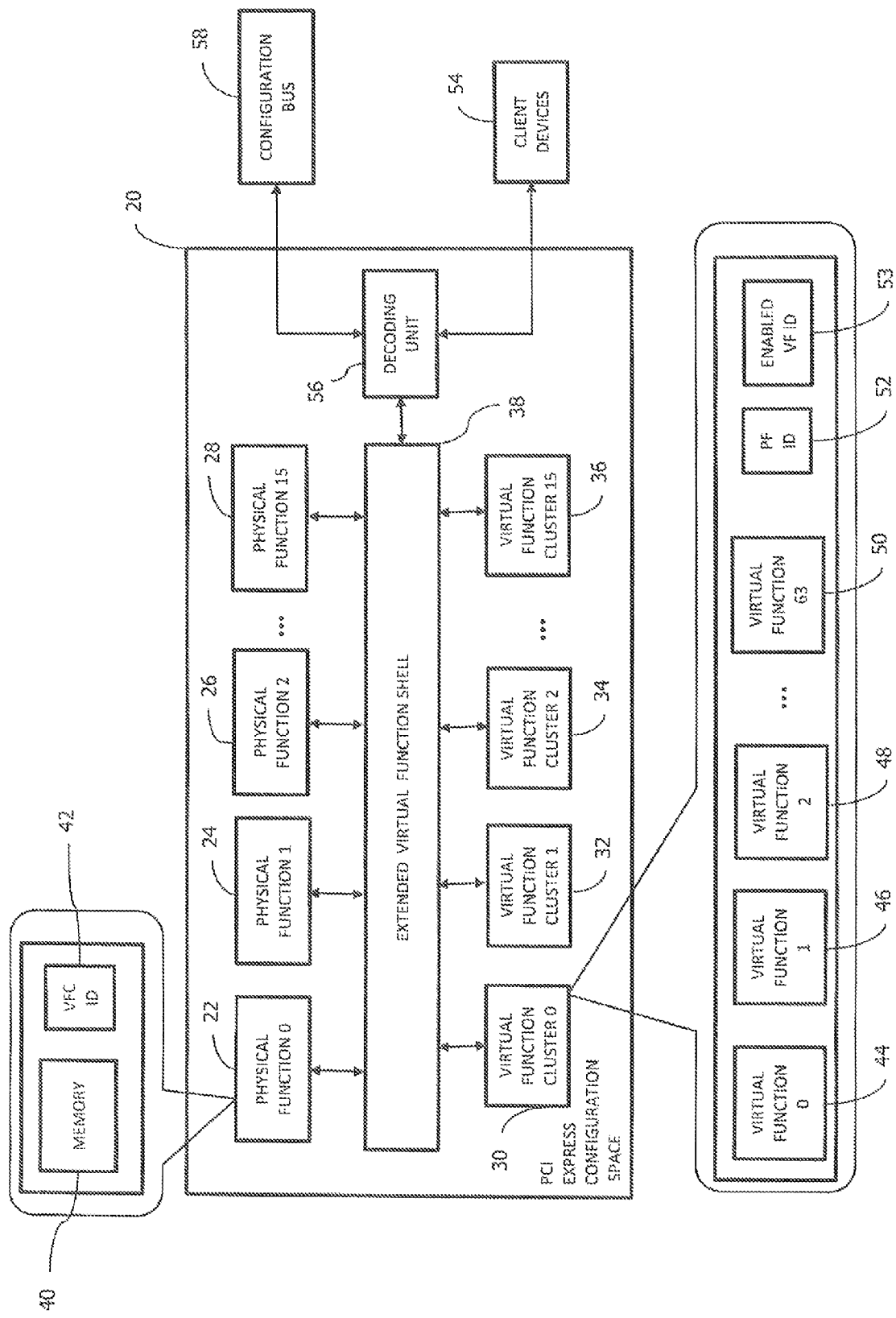
FIG. 1 is a block diagram of a PCI-Express device configured to assign virtual functions in clusters within a SR-IOV environment, in accordance with an embodiment of the present invention.

The SR-IOV/MR-IOV specification enables a large number of virtual functions to be linked to physical functions on a PCIe endpoint device operating in a SR-IOV/MR-IOV environment. Embodiments of the present invention divide virtual functions positioned on the PCI device into a first multiple of clusters. The clusters of virtual functions are coupled to a second multiple of physical functions, also positioned on the PCIe device (typically, the configuration space).

To maintain compatibility with PCI software configuration mechanisms, PCI Express elements typically have a PCIcompatible configuration space. A PCI Express endpoint can be mapped into the configuration space as a single function for a device that includes one or more functions (i.e., including the endpoint). All functions, including physical functions, are typically discoverable in the configuration space. Additionally, physical functions typically include the SR-IOV/MR-IOV extended capability, and can be used to discover, configure, and manage any virtual functions linked to each of the physical functions.

In some embodiments, each physical function may store data that is unique to the physical function and can be shared by all linked virtual functions. The sharing of unique data can significantly reduce the amount of data stored for each virtual function. Since the only (theoretical) restriction to the number of virtual functions which can be associated with a physical function, is the maximum amount of functions in TotalVFs (64 k), embodiments of the present invention assist in managing the linkage between physical and virtual functions by dividing the virtual functions of the PCIe configuration space into multiple clusters of a cluster size (i.e., a specified number of virtual functions). In some embodiments, each virtual function cluster can be linked (i.e., associated) to any physical function. Additionally, each physical function can identify any linked virtual function clusters.

Implementing clusters of virtual functions can ease the linking of virtual functions to a physical function, since the virtual functions move together in clusters from one physical function to another. Typically, the physical functions can be allocated a specific number of required virtual functions. However, since the virtual functions are grouped into clusters, the physical functions do not have to handle the migration of each virtual function (i.e., each physical function handles the migration of each virtual function cluster).

In some embodiments, virtual functions can be individually enabled or disabled within each virtual function cluster. For example, if the cluster size is 32 and a physical function needs 50 virtual functions, the physical function can be allocated two clusters, and disable the virtual functions it doesn't need (18, in this example). In some embodiments, the cluster size can be as small as one, thereby enabling the linking of a single virtual function to a physical function.

In operation, each individual cluster of virtual functions can associate to any one of the physical functions. Associating an entire virtual function cluster to a single physical function may forfeit one degree of freedom, since no single virtual function has complete freedom in the physical function it is associated with (i.e., the entire cluster is associated with a single physical function). However, clustering the virtual functions reduces the amount of wiring on the PCIe device (i.e., compared with a PCIe device where any virtual function can associate with any physical function), thereby enabling the design of PCIe devices with large numbers of virtual functions.

Since the SR-IOV and MR-IOV enhancements of the PCIe specification allows combinations of up to 64K physical and virtual functions, embodiments of the present invention enable each cluster of virtual functions to be linked to any physical function. Since any cluster of virtual functions can migrate from one physical function to another, the configuration space can effectively manage the data unique to each physical function and its associated virtual functions.

Embodiments of the present invention enable the association of large numbers (even tens of thousands) of virtual functions to one of the physical functions, by associating several virtual function clusters to the physical function. Additionally or alternatively, embodiments of the present invention enable the association of any subset of the virtual function cluster to one of the physical functions by associating one virtual function cluster with the physical function, but only the enabling the subset (i.e., at least one) of the virtual functions within the cluster.

Due to reduced wiring requirements, embodiments of the present invention enable implementing the maximum number of combined virtual and physical functions supported by the PCI-SIG SR-IOV specification, which currently 65,536 (i.e., 64 k). Additionally, clustering virtual functions as described herein supports the function dependency list, as described in the SR-IOV.

In some configurations, PCIe devices may have vendor specific dependencies between functions. For example, Function 0 might provide different mechanisms for controlling the same underlying hardware than the mechanisms provided by Function 1. In situations where these dependencies exist, the device programming model might require that these dependent functions are assigned to system images as a as a single set (A system image comprises computer software such as operating systems, used to execute applications or trusted services, e.g., a shared or non-shared I/O device driver).

FIG. 1 is a block diagram of a PCIe configuration space 20 that is an endpoint configured to group virtual functions in clusters in a SR-IOV environment, in accordance with an embodiment of the present invention. PCIe configuration space 20 comprises virtual function clusters 30, 32, 34, and 36 coupled to physical functions 22, 24, 26, and 28 via an extended virtual function shell 38. Each of physical functions 22, 24, 26, 28 comprises a memory 40 and a list of virtual function cluster identifiers (VFC IDs) 42 that link each of the respective physical functions to one of the virtual function clusters.

Each of virtual function clusters 30, 32, 34, 36 comprise virtual functions 44, 46, 48, 50 and a physical function identifier (PF ID) 52 that enables the virtual functions in a specific cluster to identify the associated physical function. In operation, each of the virtual functions can be enabled or disabled separately. Therefore, each of the virtual function clusters also comprises an enabled virtual function identifier (ID) 53 which identifies a status (i.e., enabled or disabled) of each of the virtual functions.

Memory 40 and virtual functions 44, 46, 48 and 50 may comprise dedicated data registers, a dedicated memory array, or a combination of the two. In alternative embodiments, two or more of the physical functions may share a single memory array. Likewise, two or more of the virtual functions may share a memory array. In the configuration shown in FIG. 1, PCIe configuration space 20 comprises 16 physical functions, and 16 virtual function clusters, with each of the virtual function clusters comprising 64 virtual functions. Therefore the total number of virtual functions positioned on PCIe configuration space 20 is 1,024 (i.e., 16 clusters of 64 virtual functions).

A configuration bus 58 is coupled to decoding unit 56, and configured to enable software applications executing on a processor (not shown) coupled to configuration space 20 to read and write values to the virtual functions in the configuration space.

While the configuration of the PCIe configuration space shown in FIG. 1 shows each of the virtual function clusters comprising 64 virtual functions, embodiments of the present invention may configure each of the clusters to comprise any number (i.e., within the SR-IOV/MR-IOV specification) of virtual functions, and are considered to be within the spirit and scope of the present invention. Additionally, using embodiments of the present invention, PCIe configuration space 20 may be configured to comprise any number of up to 64 k physical and virtual functions, per the SR-IOV/MR-IOV specification. These additional configurations are considered to be within the spirit and scope of the present invention.

Figure 2:
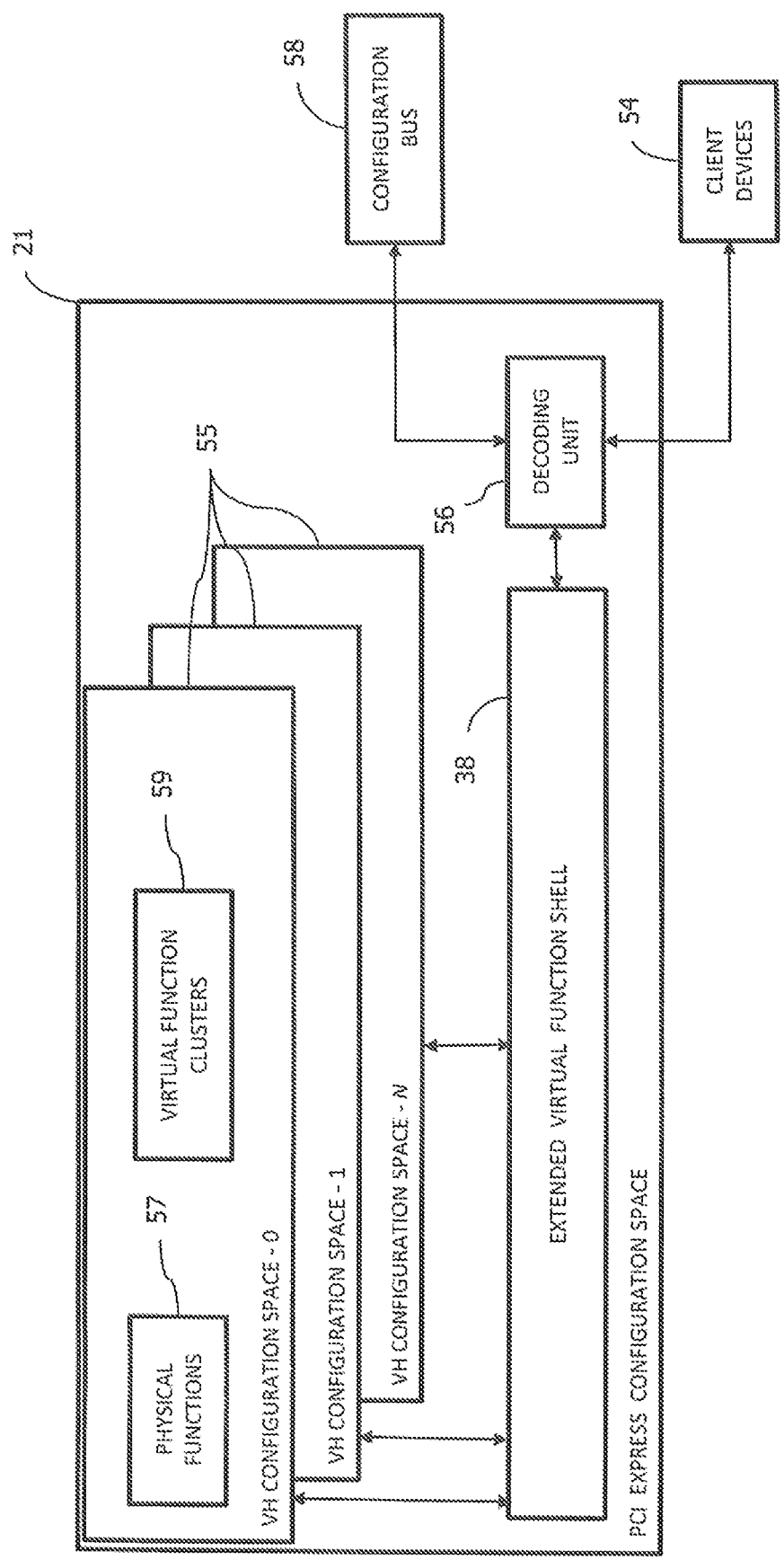
FIG. 2 is a block diagram of a PCI-Express device configured to assign virtual functions in clusters within several virtual hierarchies in a MR-IOV environment, in accordance with an embodiment of the present invention.

FIG. 2 is a block diagram of a PCI-Express configuration space 21 configured to assign virtual functions in clusters within several virtual hierarchies in a MR-IOV environment, in accordance with an embodiment of the present invention. PCIe configuration space 21 comprises multiple virtual hierarchy (VH) configuration spaces 55, where each of the VH configuration spaces functions individually as a SR-IOV. Each VH configuration space 55 comprises physical functions 57 (e.g., physical functions 0-15, as shown in FIG. 1) and virtual function clusters 59 (e.g., virtual function clusters 0-15, as shown in FIG. 1).

In the configuration shown in FIG. 2, there are N+1 instances of physical functions 57 and virtual functions 59 (i.e., there are N+1 instances of VH configuration space 55). Each instance of the individual physical and the virtual functions is positioned on one of the VH configuration spaces. While the configuration in FIG. 2 shows the VH configuration spaces coupled to a single extended virtual function shell 38, other configurations of PCIe configuration space 21 may comprise multiple extended virtual function shells 38, and are considered to be within the spirit and scope of the present invention.

Figure 3:
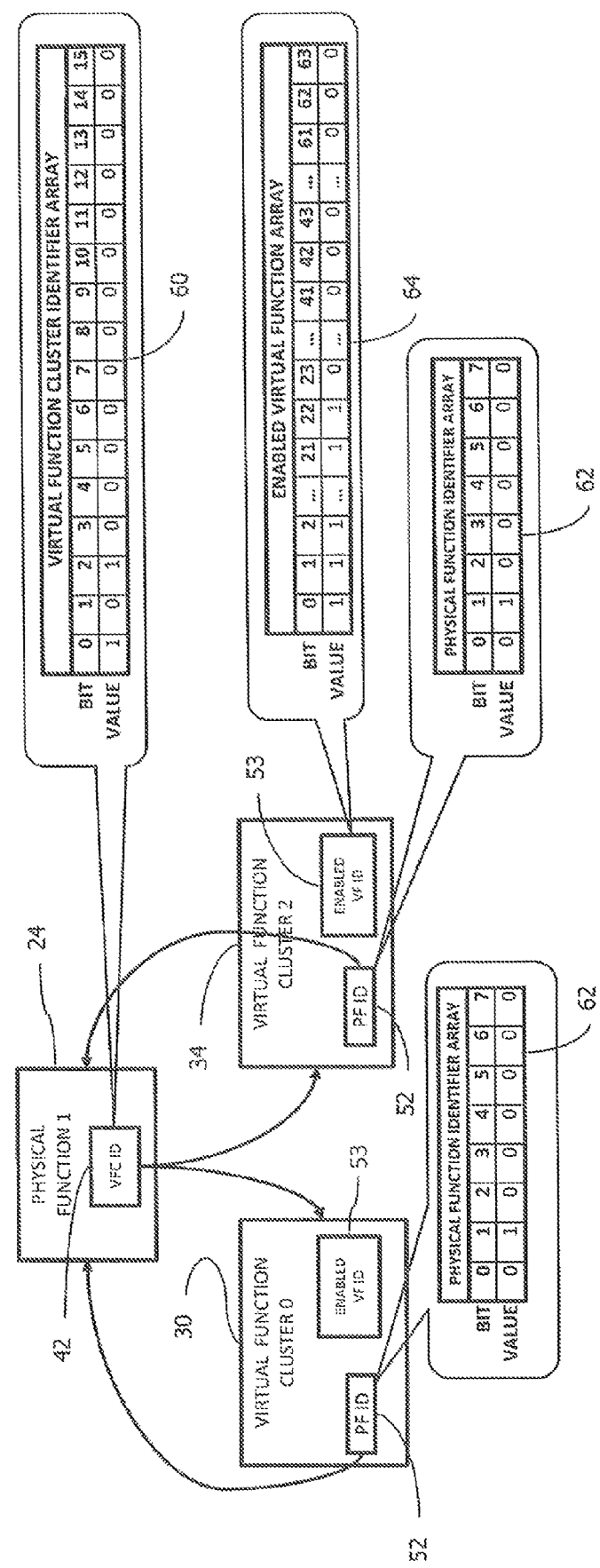
FIG. 3 is a block diagram that schematically illustrates a linking of physical functions to clusters of virtual functions, in accordance with an embodiment of the present invention.

FIG. 3 is a block diagram that schematically illustrates associating physical functions with clusters of virtual functions, in accordance with an embodiment of the present invention. VFC ID 42 typically comprises a virtual function cluster identifier array 60 with one bit referencing each of the virtual function clusters.

In the configuration shown in FIG. 3, array 60 comprises 16 bits, where each bit references one of the virtual function clusters. Therefore, a "1" stored to one of the bits in array 60 indicates which one of the virtual function clusters is associated with the physical function that contains array 60. Since each of the physical functions may be associated with more than one virtual function clusters, different bits in VF array may simultaneously store a "1".

PF ID 52 comprises physical function identifier array 62, with each bit referencing one of the physical functions, and a "1" can be stored in the appropriate bit representing the physical function associated with the virtual function cluster that contains array 62. Virtual function ID 53 comprises enabled virtual function array 64, with each bit (i.e., there are 64 bits in the array) referencing one of the virtual functions in the cluster associated with the enabled virtual function array. A "1" is stores to bits representing enabled virtual functions, and a "0" is stored to bits representing disabled virtual functions. In the configuration shown in FIG. 3, virtual functions 0-22 are enabled in the cluster, and virtual functions 23-63 are disabled.

PCIe configuration space 20 may be configured to employ alternative configurations (not shown) to manage the relationship between the virtual function clusters and the physical functions. In some embodiments, configuration space 20 may include a linked list of virtual function clusters. Alternatively, configuration space 20 may store the identity of the first cluster and the number of clusters linked to the specific physical function. For example, if the virtual function cluster referenced by bit "7" in virtual function cluster identifier array 60 is linked to physical function 26, and the number of virtual function clusters linked to physical function 26 is four, then the virtual function clusters referenced by bits "7", "8", "9" and "10" in the virtual function cluster identifier array are linked to physical function 26.

As indicated in FIG. 3, physical function 24 is associated with virtual function clusters 30 and 34. Therefore, the first and third bits in VFC ID 42 for physical function 24 store a "1" representing virtual function clusters 30 and 34 (i.e., the first and third virtual function clusters). Additionally, the second bit in each PF ID 52 for virtual function clusters 30 and 34 store a "1" representing physical function 24 (i.e., the second physical function).

Virtual function shell 38 comprises hardware logic dedicated to initializing and managing the virtual function clusters, and to interacting with the physical and the virtual functions, per the SR-IOV/MR-IOV specification. In operation, when initializing PCIe configuration space 20, shell 38 stores a first value (i.e., array 60) indicating one of the physical functions to VFC ID 42 for each of the virtual function clusters Likewise, shell 38 stores a second value indicating one or more of the virtual function clusters to VFID 42.

Additionally, extended virtual function shell 38 can manage the virtual function clusters using the instances of VFC ID 42 and PF ID 52 on PCIe configuration space 20. As an example, assume virtual function cluster 30 is associated with physical function 22. To retrieve data from virtual function 44, extended virtual function shell 38 identifies that a specific one of the virtual function clusters (in this case cluster 30) contains virtual function 22. Examples of the data include, but are not limited to a packet, a message and an error. Shell 30 then identifies, using PF ID 52 of cluster 30, a specific one of the physical functions, in this case physical function 24.

Shell 38 can then combine the shared data from physical function 24 with the unique data from virtual function 44, in order to produce a data result. Alternatively, shell 38 may convey the data result to one of client devices 54 via a decoding unit 56. Examples of client devices include, but are not limited to a transport layer, a data link layer and a physical layer.

While a specific number of the virtual functions are grouped together into a cluster, it is not required that all the virtual functions in any of the clusters be enabled. In operation, PCI configuration space 20 can enable and/or disable specific physical function and virtual functions. Disabling virtual functions enables configuration space 20 to meet the requirements of each of the physical functions. For example, if the cluster size is 32 (virtual functions) and physical function 24 only needs 16 virtual functions, configuration space 20 can enable 16 virtual functions and disable 16 virtual functions in virtual function cluster 30. Each of the virtual function clusters can store an instance of enabled virtual function array 64, indicating which of the virtual functions are enabled and/or disabled.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. An apparatus for use in an IO virtualization environment, comprising:
    a first plurality of virtual function clusters positioned in a Peripheral Component Interconnect Express (PCIe) configuration space, each cluster comprising one or more virtual functions and operative to aid in managing linking virtual functions to a physical function by dividing virtual functions of said PCIe configuration space into groups of virtual functions, wherein once the virtual functions are clustered, each virtual function forfeits one degree of freedom such that they are not reconfigurable in the PCIe configuration space and the clusters of virtual functions move as a unit from one physical function to another;
    a second plurality of physical functions positioned in the PCIe configuration space; and
    an extended virtual function shell positioned in the PCIe configuration space and configured to select one of the physical functions and one of the available virtual function clusters, and to associate the selected virtual function cluster with the selected physical function.

2. The apparatus according to claim 1, wherein the PCIe configuration space comprises an endpoint operating in a single root input/output virtualization environment.

3. The apparatus according to claim 1, wherein the PCIe configuration space comprises an endpoint operating in a multiple root input/output virtualization environment.

4. The apparatus according to claim 1, wherein each of the virtual functions comprises a memory selected from a group consisting of a memory array and one or more registers.

5. The apparatus according to claim 4, wherein each of the physical functions comprises a memory selected from a group consisting of a memory array and one or more registers.

6. The apparatus according to claim 5, wherein each of the virtual function clusters further comprises a physical function identifier configured to store a first value indicating one of the physical functions.

7. The apparatus according to claim 6, wherein each of the physical functions further comprises a virtual function identifier configured to store a second value indicating one or more of the virtual function clusters.

8. The apparatus according to claim 7, wherein the extended virtual function shell is configured to receive data for a specific one of the virtual functions, to identify a specific one of the virtual function clusters containing the specific virtual function, to identify, using the physical function identifier of the identified virtual function cluster, a specific one of the physical functions associated with the identified virtual function cluster, and to retrieve the data from the identified physical function.

9. The apparatus according to claim 7, wherein the data is selected from a packet, a message and an error.

10. The apparatus according to claim 7, wherein the extended virtual function shell is configured to store the data to the specific virtual function.

11. The apparatus according to claim 7, wherein the extended virtual function shell is configured to convey the data to a client coupled to the PCIe configuration space.

12. The apparatus according to claim 11, wherein the client is selected from a group consisting of a transport layer, a physical layer and a data link layer.

13. A method for use in an IO virtualization environment, said method comprising:
    selecting a virtual function cluster comprising at least one virtual function, the cluster one of a first multiple of clusters positioned in a Peripheral Component Interconnect Express (PCIe) configuration space, each cluster comprising one or more virtual functions and operative to aid in managing linking virtual functions to a physical function by dividing virtual functions of said PCIe configuration space into groups of virtual functions, wherein once the virtual functions are clustered, each virtual function forfeits one degree of freedom such that they are not reconfigurable in the PCIe configuration space and the clusters of virtual functions move as a unit from one physical function to another; and
    associating the selected cluster to a physical function, the physical function one of a second multiple of physical functions positioned in the PCIe configuration space.

14. The method according to claim 13, wherein the PCIe configuration space comprises an endpoint operating in a single root input/output virtualization environment.

15. The method according to claim 13, wherein the PCIe configuration space comprises an endpoint operating in a multiple root input/output virtualization environment.

16. The method according to claim 13, wherein each of the virtual functions comprises a memory selected from a group consisting of a memory array and one or more registers.

17. The method according to claim 13, wherein each of the physical functions comprises a memory selected from a group consisting of a memory array and one or more registers.

18. The method according to claim 17, wherein each of the virtual function clusters further comprises a physical function identifier configured to store a first value indicating one of the physical functions.

19. The method according to claim 17, wherein each of the physical functions further comprises a virtual function identifier configured to store a second value indicating one or more of the virtual function clusters.

20. The method according to claim 19, further comprising:
    receiving, by the extended virtual function shell, data for a specific one of the virtual functions;
    identifying, a specific one of the virtual function clusters containing the specific virtual function;
    identifying, using the physical function identifier of the identified virtual function cluster, a specific one of the physical functions associated with the identified virtual function cluster; and
    accessing the identified physical function.

21. The method according to claim 20, wherein the data is selected from a packet, a message and an error.

22. The method according to claim 20, and comprising storing the data to the specific virtual function.

23. The method according to claim 20, and comprising conveying the data to a client coupled to the PCIe configuration space.

24. The method according to claim 23, wherein the client is selected from a group consisting of a transport layer, a physical layer and a data link layer.

* * * * *